US010597546B2

United States Patent
De Saint-Romain

(10) Patent No.: US 10,597,546 B2
(45) Date of Patent: *Mar. 24, 2020

(54) LIQUID COMPOSITION, ESPECIALLY INK COMPOSITION, FOR PRINTING WITH A BINARY DEFLECTED CONTINUOUS JET, WITH NON-CHARGED DROPS, USE OF SAID COMPOSITION, MARKING METHOD AND MARKED SUBSTRATE

(71) Applicant: Dover Europe Sàrl, Vernier (CH)

(72) Inventor: Pierre De Saint-Romain, Valence (FR)

(73) Assignee: DOVER EUROPE SÀRL, Vernier (CH)

(*) Notice: Subject to any disclaimer, the term of this patent is extended or adjusted under 35 U.S.C. 154(b) by 471 days.

This patent is subject to a terminal disclaimer.

(21) Appl. No.: 15/399,939

(22) Filed: Jan. 6, 2017

(65) Prior Publication Data
US 2017/0190926 A1    Jul. 6, 2017

(30) Foreign Application Priority Data
Jan. 6, 2016 (FR) ..................... 16 50093

(51) Int. Cl.
C09D 11/033 (2014.01)
C09D 11/106 (2014.01)
C09D 11/107 (2014.01)
C09D 11/30 (2014.01)
C09D 11/322 (2014.01)
C09D 11/328 (2014.01)
C09D 11/36 (2014.01)
C09D 11/38 (2014.01)
C09D 11/52 (2014.01)
B41J 2/02 (2006.01)
B41M 5/50 (2006.01)
C09D 7/40 (2018.01)

(52) U.S. Cl.
CPC ............ *C09D 11/033* (2013.01); *B41J 2/02* (2013.01); *B41M 5/506* (2013.01); *C09D 7/67* (2018.01); *C09D 11/106* (2013.01); *C09D 11/107* (2013.01); *C09D 11/30* (2013.01); *C09D 11/322* (2013.01); *C09D 11/328* (2013.01); *C09D 11/36* (2013.01); *C09D 11/38* (2013.01); *C09D 11/52* (2013.01)

(58) Field of Classification Search
None
See application file for complete search history.

(56) References Cited

U.S. PATENT DOCUMENTS

| 4,024,096 A | 5/1977 | Wachtel |
| 4,153,593 A | 5/1979 | Zabiak et al. |
| 4,155,767 A | 5/1979 | Specht et al. |
| 4,155,895 A | 5/1979 | Rohowetz et al. |
| 4,166,044 A | 8/1979 | Germonprez et al. |
| 4,210,566 A * | 7/1980 | Murray ............... C09D 11/36 106/31.06 |
| 4,260,531 A | 4/1981 | Wachtel et al. |
| 4,465,800 A | 8/1984 | Bhatia |
| 4,567,213 A | 1/1986 | Bhatia et al. |
| 4,756,758 A | 7/1988 | Lent et al. |
| 4,834,799 A | 5/1989 | Song |
| 4,880,465 A | 11/1989 | Loria et al. |
| 5,102,458 A | 4/1992 | Lent et al. |
| 5,316,575 A | 5/1994 | Lent et al. |
| 5,395,431 A | 3/1995 | Siddiqui et al. |
| 5,395,432 A | 3/1995 | Nelson et al. |
| 5,594,044 A | 1/1997 | Yang |
| 5,637,139 A | 6/1997 | Morelos et al. |
| 6,869,986 B1 * | 3/2005 | Millot ................ C09D 11/36 523/160 |
| 7,081,158 B2 * | 7/2006 | Sabys ................. C09D 11/30 106/31.37 |
| 7,192,121 B2 | 3/2007 | Barbet et al. |
| 7,833,334 B2 * | 11/2010 | de Saint-Romain ... C09D 11/38 106/31.13 |
| 8,162,450 B2 | 4/2012 | Barbet |
| 8,282,724 B2 | 10/2012 | Goustiaux et al. |
| 8,540,350 B2 | 9/2013 | Barbet |
| 8,734,921 B2 * | 5/2014 | De Saint-Romain ........ C09D 11/38 428/34.7 |
| 9,783,695 B2 * | 10/2017 | Barbet ................. C09D 11/30 |
| 9,850,392 B2 * | 12/2017 | De Saint-Romain ........ C09D 11/322 |
| 10,266,715 B2 * | 4/2019 | Barbet ................. C09D 11/52 |
| 2012/0026224 A1 | 2/2012 | Anthony et al. |

(Continued)

FOREIGN PATENT DOCUMENTS

EP   0 034 881 A1   9/1981
EP   0 289 141 A2   11/1988

(Continued)

OTHER PUBLICATIONS

EPO Search Report for EP 3190160, dated Feb. 3, 2017; 2 pages.*

(Continued)

Primary Examiner — Helene Klemanski
(74) Attorney, Agent, or Firm — Pearne & Gordon LLP

(57) ABSTRACT

Liquid composition, such as an ink composition, liquid at room temperature, the liquid composition being a liquid composition specifically for printing with a binary deflected continuous jet printing technique wherein the liquid composition forms upon printing drops which are not charged by an electric field, which each have a zero electric charge, which each form a dipole under the effect of an electric field, and then are then deflected by the electric field, characterised in that the liquid composition comprises a solvent comprising one or more organic solvent compound(s) and optionally water, the solvent having globally a dielectric constant less than 15; a binder; one or more dyes and/or pigments; and in that the liquid composition has an electrical conductivity at 20° C. less than or equal to 200 μS/cm, preferably less than or equal to 150 μS/cm, still preferably less than or equal to 100 μS/cm.

55 Claims, No Drawings

(56) References Cited

U.S. PATENT DOCUMENTS

| | | | |
|---|---|---|---|
| 2012/0154480 A1 | 6/2012 | Anthony et al. | |
| 2013/0307891 A1 | 11/2013 | Barbet et al. | |
| 2014/0050868 A1* | 2/2014 | De Saint-Romain | C09D 11/102 |
| | | | 428/35.2 |
| 2014/0168322 A1 | 6/2014 | Bonneton | |
| 2016/0075897 A1* | 3/2016 | Barbet | C09D 11/30 |
| | | | 428/196 |
| 2017/0342292 A1* | 11/2017 | Barbet | C09D 11/30 |

FOREIGN PATENT DOCUMENTS

| | | |
|---|---|---|
| EP | 0 510 752 A1 | 10/1992 |
| EP | 0 735 120 A2 | 10/1996 |
| EP | 1 200 530 | 5/2002 |
| EP | 1 858 990 | 11/2007 |
| EP | 2 998 370 A1 | 3/2016 |
| FR | 2 460 982 A1 | 1/1981 |
| FR | 2 851 495 A1 | 8/2004 |
| FR | 2 906 755 A1 | 4/2008 |
| FR | 2 952 851 A1 | 5/2011 |
| FR | 2 971 199 A1 | 8/2012 |
| FR | 2 975 632 A1 | 11/2012 |
| GB | 2 277 094 A | 10/1994 |
| GB | 2 286 402 A | 8/1995 |
| GB | 2 298 713 A | 9/1996 |
| WO | 92/14794 A1 | 9/1992 |
| WO | 92/14795 A1 | 9/1992 |
| WO | 95/29287 A1 | 11/1995 |
| WO | 96/23844 A1 | 8/1996 |
| WO | 01/09255 A1 | 2/2001 |
| WO | 2005/070676 A2 | 8/2005 |
| WO | 2006/097502 A1 | 9/2006 |
| WO | 2008/040777 A1 | 4/2008 |
| WO | 2011/061331 A1 | 5/2011 |
| WO | 2011/078854 A1 | 6/2011 |
| WO | 2012/107461 A1 | 8/2012 |
| WO | 2012-163830 A1 | 12/2012 |

OTHER PUBLICATIONS

EPO Written Opinion for EP 3190160, dated Feb. 3, 2017; 4 pages.*
Isobar M datasheet from Exxon Mobile Chemical, Nov. 2006; 1 page.*
Isobar G datasheet from Brenntag, Apr. 2018; 2 pages.*
"Isopar fluids for personal care products" from Exxon Mobile Chemical, no date available; 2 pages.*
French Search Report issued in Patent Application No. FR 1650093 dated Jul. 15, 2016.

* cited by examiner

LIQUID COMPOSITION, ESPECIALLY INK COMPOSITION, FOR PRINTING WITH A BINARY DEFLECTED CONTINUOUS JET, WITH NON-CHARGED DROPS, USE OF SAID COMPOSITION, MARKING METHOD AND MARKED SUBSTRATE

TECHNICAL FIELD

The invention relates to a liquid composition, such as an ink composition, for printing, and/or treating, and/or marking and/or encoding substrates, supports and objects of any kind, notably textile substrates, the properties of which are specifically adapted to the printing, and/or to the treating, and/or to the marking and/or to the encoding of a very wide variety of substrates, supports and objects of any kind, with the binary deflected continuous liquid jet printing technique, with non-charged drops.

The liquid composition, such as an ink composition, according to the invention is preferably a volatile solvent composition.

More specifically, this binary deflected continuous jet printing technique is a technique in which the liquid composition forms upon printing drops which are not charged by an electric field, which each have a zero electric charge, which each form a dipole under the effect of an electric field, and which are then deflected by said electric field.

For convenience, this printing technique will be designated hereafter "SPI" technique.

The invention also relates to the use of this liquid composition, such as an ink composition, according to the invention, in a printer or a printing head applying the printing technique with a liquid jet, notably with an ink jet, a so-called "SPI" technique.

The invention further relates to a method of printing, and/or treating, and/or marking and/or encoding a substrate, support, or object, notably made of textile, by projection on this substrate, support, or object, such as a textile substrate, of said liquid composition such as an ink composition with the printing technique with a liquid jet, a so-called "SPI" technique.

The invention finally relates to a substrate, support, or object, notably made of textile, provided with a printing and/or a treating and/or a marking and/or an encoding obtained by drying and/or absorption (in the substrate, support or object), of the liquid composition such as an ink composition according to the invention.

The technical field of the invention is generally that of printing with a liquid jet notably with an inkjet.

STATE OF THE PRIOR ART

Ink jet printing is a well-known technique, which allows the printing, the marking, or the decoration of any kind of objects, at high speed, and without contact of these objects with the printing device, of messages variable at will, such as bar codes, sell-by dates, and this even on non-flat supports.

Printing techniques with an ink jet are divided into two main types: i.e. the so-called "Drop on Demand" (DOD) technique, and the so-called "Continuous Ink Jet" (CIJ) technology.

The projection with a "drop on demand" jet may be ensured by an ink jet, a so-called "bubble ink jet", by a so-called "piezoelectric" ink jet, by a so-called "valve ink jet" or finally by a so-called "hot melt" or with a phase transition ink jet.

In the case of the bubble ink jet, the ink is vaporized in the vicinity of the nozzle and this vaporization causes the ejection of a small amount of ink located between the resistor that vaporizes the ink and the nozzle. In the case of the piezoelectric ink jet, a sudden pressure variation caused by an actuator set into motion by the electric excitation of a piezoelectric crystal or ceramic and located in the vicinity of the nozzle, causes the ejection of an ink drop.

In the case of the "hot melt" ink jet, the ink is without any solvent and it is brought to beyond its melting point.

The drop-on-demand printing may therefore be carried out at room temperature, this is the case of the piezoelectric ink jet, of the valve ink jet or of the bubble ink jet, or at high temperature, for example from about 60° C. to 130° C., this is the case of the so-called "hot melt" (HM) ink jet or with a phase transition. The projection by a deflected continuous jet consists in sending pressurized ink into a cavity containing a piezoelectric crystal, from which the inks escapes through an orifice (nozzle) in the form of a jet. The piezoelectric crystal, vibrating at a determined frequency, causes pressure perturbations in the ink jet, which oscillates and gradually breaks into spherical droplets. An electrode, the so-called "charging electrode", placed in the path of the jet, where it breaks, makes it possible to give to these drops an electrostatic charge, if the ink is conductive. The thereby charged drops are deflected in an electric field and allow printing. The non-charged drops, therefore not deflected, are recovered in a gutter where the ink is sucked up, then recycled towards the ink circuit.

For all the types of ink jet technology, the viscosity of the inks is very low at the projection temperature, typically from 1 to 10 cPs or 15 cPs, and these technologies may therefore be described as low viscosity ink depositing technologies.

Projection of ink with a jet ensures contactless marking at a high running rate over objects which are not necessarily planar and with the possibility of changing messages at will.

The ink compositions, suitable for projection with a jet, notably for projection with a continuous deflected jet, should meet a certain number of criteria inherent to this technique, relating, inter alia, to the viscosity, the solubility in a solvent for cleaning, the compatibility of ingredients, proper wetting of the supports to be marked, etc., and electrical conductivity in the case of deflected continuous jet.

Further, these inks should dry rapidly, be capable of passing through the nozzle without blocking it, with great stability of orientation of the jet while allowing easy cleaning of the printing head.

The very diverse application fields of these ink compositions requires varied ink formulations, adapted to the wide variety of substrates to be marked (metals, plastics, glass, etc.) and meeting a very wide variety of industrial constraints. In particular, the water resistance of the marking may be an important requirement.

The ingredients which make up present inks, for the ink jet of the deflected continuous jet type, are organic or mineral products; these are colorant materials, such as dyes or pigments, resins or binders, in one or more solvent(s), more or less volatile, or in water, optionally one or more conductivity salt(s), as well as various additives.

The colorant materials are known as "dyes or pigments", depending on whether they are respectively soluble or insoluble in the solvent used.

The pigments, by nature insoluble, are thus dispersed and may be opaque or not. They provide to the ink its colour, its opacity, or particular optical properties, such as fluorescence (cf. patent or patent applications U.S. Pat. Nos. 4,153,593 A, 4,756,758 A, 4,880,465 A, EP-A-0 289 141, U.S. Pat. No.

5,395,432 A, GB-A-2 298 713). In certain cases, the dyes also provide themselves sufficient conductivity to the ink so that there is no need to add a conductivity salt. The dyes known under the name C. I. Solvent Black 27, 29, 35 and 45 are in this case.

Substrates, supports, which are white or of light colours are marked with black or coloured inks, and the dyes or pigments of these inks are based on organic or mineral dyes or pigments, usually transparent.

Substrates, supports, which are black or of dark colours are marked with inks containing opaque pigments, the most common being titanium oxide.

The binder(s) or resin(s) is (are) generally mostly one (or several) solid polymer compound(s) and their selection is dictated by their solubility in the selected solvents and by their compatibility with the dyes and the other additives, but also and above all the properties that they provide to the film of ink, once dry (see patents or patent applications U.S. Pat. No. 4,834,799 A, GB-A-2 286 402, U.S. Pat. Nos. 5,594,044 A, 5,316,575 A, WO-A-96/23844, WO-A-95/29 287).

Their primary function is to provide to the ink adherence on the maximum of supports or on specific supports, for example non-porous. They also make it possible to give to the ink the appropriate viscosity for the formation of drops from the jet and they provide to the ink, or rather to the marking obtained, most of its properties of resistance to physical and/or chemical aggressions.

The solvent of these inks is constituted most frequently of a mixture comprising, on the one hand, a majority amount of volatile solvent compounds, not very viscous, in order to allow the very rapid drying of the markings and to adjust the viscosity to the desired value, for example from 2 to 10 mPa·s and, on the other hand, more viscous, less volatile and slower drying solvents, in a lesser amount, to avoid the drying of the ink in the nozzle during stoppage phases of the printing apparatus (cf. patents or patent applications U.S. Pat. No. 4,155,767 A, WO-A-92 14794, WO-A-92 14 795 and U.S. Pat. No. 4,260,531 A).

The volatile solvent compounds used the most often are alcohols, ketones or esters of low molecular weight, as is indicated in the patents U.S. Pat. Nos. 4,567,213 A, and 5,637,139 A. Among these solvent compounds may be cited essentially methanol, ethanol, 1- and 2-propanol, acetone, methyl ethyl ketone (MEK), and methyl isobutyl ketone.

Less volatile solvent compounds having notably a drying retarding function are usually ketones, such as cyclohexanone, glycol ethers, cited in the documents U.S. Pat. Nos. 4,024,096 A and 4,567,213 A, ethers and acetals, such as furan or dioxan, mentioned in the document U.S. Pat. No. 4,155,767 A, dimethyl formamide or dimethylsulfoxide (U.S. Pat. No. 4,155,895 A), lactones (EP-A-0 034 881), N-methyl pyrrolidone (EP-A-0 735 120), glycols (WO-A-96 23 844), and even aliphatic hydrocarbons (U.S. Pat. No. 4,166,044 A) or water, alone or in combination with other solvents, cited above, reference may be made, in this respect, to the documents U.S. Pat. No. 4,153,593 A, GB-A-2 277 094 and FR-A-2 460 982.

Generally speaking, the main or majority solvent compounds of inks for projection by deflected continuous jet have to meet a certain number of criteria, in particular:

their volatility must be sufficient so that the ink dries rapidly on the support to be marked, but not too high, in order not to evaporate too quickly in the printer, in particular during stoppage phases;

their solvent power (solvency), vis-à-vis the binders of the ink, the dyes or the pigmentary dispersions and vis-à-vis the supports to print, must make it possible to confer good adherence to the dry ink;

their effects on the health of persons, namely their toxicity, harmfulness, irritant character and flammability, must be reduced;

they must make it possible to maintain sterile an ink optionally intended to be ingested;

finally, they must have the capacity to maintain dissolved and dissociated ionic species such as the salts that give the ink its electrical conductivity.

The additives comprise dispersants that enable the dispersion of the pigments, surfactants that modify the wettability or penetrability of the ink (U.S. Pat. No. 5,395,431 A), in particular those that modify or regulate static or dynamic surface tension, such as Fluorad® FC 430 of the 3M® Company, agents that inhibit corrosion induced by the salts that provide conductivity (see documents EP-A-0 510 752, U.S. Pat. No. 5,102,458 A), or instead additives that protect the ink against proliferations of bacteria and other microorganisms: these are biocides, bactericides, fungicides and others, particularly useful in inks containing water, pH regulating buffers (see EP-A-0 735 120), anti-foaming agents.

The optional conductivity salt(s) provide to the ink the conductivity required for electrostatic deflection. Reference may be made in this respect to the document U.S. Pat. No. 4,465,800 A.

Among salts that provide conductivity are used all kinds of ionizable species, soluble and dissociable in the solvent medium of the ink.

For inks where the majority solvent compound of the solvent is water, imparting conductivity to the ink generally does not pose a problem, because most products soluble in water are ionizable species.

But the aqueous medium does not enable a wide variety of formulations, because the solvent power of water is limited, and the rate of evaporation of water is too slow in order to be able to benefit from the high printing rate allowed by ink jet.

On the contrary, a wide variety of organic solvent compounds exist that have a strong dissolving power vis-à-vis numerous polymers and dyes, which makes it possible to formulate a very large number of inks with rapid drying, having excellent adherence on all kinds of substrates.

On the other hand, in these organic media, electrical conductivity is only obtained when the solvent compounds are sufficiently dissociative, that is to say when their dielectric permittivity and their dipolar moment are sufficiently high.

More exactly, electrical conductivity is provided to the ink by salts, generally conductivity salts. But these salts can only provide electrical conductivity to the ink if the solvents are dissociative vis à vis the species present in the ink to give ions.

It is normally considered that solvent compounds of which the dielectric constant is less than around 15 are not capable of giving to the ink the necessary conductivity for projection by a deflected continuous ink jet.

In other words, the solvents must have a high dielectric constant, greater than 15, in order to be sufficiently dissociative for the ions and to give sufficient conductivity to the ink.

It is generally accepted that the minimum conductivity that an ink must have for this type of projection with a jet is of the order of 500 µS/cm.

Furthermore, the salts can negatively contribute to the stability of the ink.

Consequently, in order to be able to be projected by the deflected continuous jet technique, the inks may only be formulated with a solvent only comprising dissociative solvent compounds or including a majority of such dissociative solvent compounds.

In other words, solvents of low dielectric constant, non-dissociative, cannot be used in ink compositions for the classical, standard "CIJ" technique.

Thus, the document EP-A0-1 858 990 (WO-A1-2006/097502) teaches that the solvents of inks for the deflected continuous jet printing technique must have a dielectric constant greater than about 15 to dissociate sufficiently the ionic species such as the salts and to give sufficient conductivity to the inks.

The document EP-A0-1 200 530 (WO-A1-01/09255) teaches that 1-3 dioxolane, the dielectric constant of which is 7.1, has insufficient dissociating power and must be associated with another more dissociative solvent to give to inks for the deflected continuous jet printing technique the necessary electrical conductivity.

The patent U.S. Pat. No. 8,282,724 B2 teaches that ethylal, the dielectric constant of which is 2.5, has insufficient dissociating power and has to be associated with another more dissociative solvent to give to inks for the deflected continuous jet printing technique the necessary electrical conductivity.

But however, it is always necessary that the volatility of these solvent compounds is sufficient so that the ink dries rapidly on the support to be marked, Yet very few solvent compounds exist that are both volatile and dissociative.

These solvent compounds, both volatile and dissociative, are almost exclusively ketones and alcohols of low molecular mass such as acetone, methyl ethyl ketone, methanol and ethanol, and the use of some of these solvent compounds, such as methanol, is not desirable on account of their toxicity.

Esters that have volatilities comparable with low molecular mass ketones and alcohols have dielectric constants less than 10, and cannot be used as sole components of solvents for inks.

Finally, inks for marking, encoding, or printing based on volatile solvent compounds must contain a majority of dissociative solvent compounds to be projectable, sprayable, with the deflected continuous jet printing technique, which considerably restricts the possible choices for these solvent compounds and, consequently, also restricts the possible choices for the binders and dyes, and finally considerably limits the possible formulations of inks.

Furthermore, a printing technique with a liquid jet notably an ink jet, which we shall call conveniently in the following, and in order to avoid repetitions, an "SPI" technique which is the acronym of "super piezo ink jet", has been developed recently.

This "SPI" technique is both different from the so-called "drop-on-demand" (DOD) technique and from the so-called "continuous ink jet" (CIJ) technology.

The "SPI" technique may be defined, for simplification, as a printing technique with a binary "CIJ" deflected continuous jet in which, unlike the printing technique with a deflected continuous jet where the projected printing drops each have a non-zero net electric charge, the drops are not charged with an electric field, each have a zero net electric charge and each forms a dipole under the effect of an electric field, and are then deflected by this field.

By "binary" is meant:
that there exists a first trajectory of the drops for printing, and a second trajectory of the drops for recycling the ink. In this second trajectory of the drops, the drops are recovered in a gutter where the ink is sucked up, and then recycled towards the ink circuit
that a message with a height of N pixels requires a printing head with N nozzles.

It is important to note that, while in the printing technique with a "CIJ" deflected continuous jet, these are deflected drops which are printed, in the so called "SPI" technique these are on the contrary non-deflected drops which are printed.

The "SPI" technique is thus widely described in the following documents [1] and [2] to which reference is made here explicitly and which are introduced into the present description in their entirety.

Document WO-A2-2005/070676 (corresponding to documents FR-A1-2 851 495 and U.S. Pat. No. 7,192,121 B2) [1], describes how to form drops in this technique by means of a printing head provided with an internal stimulation system.

More specifically, this document, according to its claim 1, relates to an ink jet printer comprising:
a printing head with one or more nozzles having an accommodating head body notably for each nozzle,
a hydraulic path of the ink comprising a stimulation chamber in hydraulic communication with one of the printing nozzles emitting a pressurized ink jet along an axis of this nozzle,
internal means for stimulating the ink jet emitted by the nozzle mechanically coupled with the ink accommodated in the stimulation chamber, these means acting on the jet emitted by the nozzle for controllably breaking up the jet, and
means for recovering the ink which is not received by a printing substrate,
a generator of electric control signals receiving a control signal and delivering to the stimulation means, stimulation signals,
a layout of charging electrodes defining around the axis of the nozzle upstream and downstream areas, the downstream area being further away from the nozzle than the upstream area, upstream and downstream electrodes of this layout being connected to electric potential sources so as to maintain in one of the areas a potential equal to that of the ink found in the body of the printing head, and in the other one of these areas a potential different from that of the ink found in the body of the printing head,
a layout of deflection electrodes axially located downstream from the layout of the charging electrodes
characterised in that the generator of electric control signals delivers by means of stimulation of the signals causing controlled breaking up of the jet intermittently in an upstream breaking up position located in the upstream area, in order to intermittently form a drop, thus separating the jet into a drop and a segment and also causing controlled breaking up of the jet or of segments of the jet continuously in a downstream breaking up position, the continuous jet emitted by the nozzle thus being transformed after the downstream area into a continuous sequence, train, of electrically charged and non-charged ink drops This document further relates, according to its claim 13, to a method for printing on a support by means of said printer in which an ink jet emitted by a nozzle of the printer is fractionated in order to form first drops which will hit a substrate in order to form points and segments, sections characterised in that,
the jet or the segments resulting from the fractionation of the jet into first drops and segments are further fractionated into second drops, the second drops resulting from this last fractionation being directed towards the gutter.

This document, according to its claim 14, finally relates to an ink jet printer head comprising:
- a printing head with one or more nozzles having an accommodating head body (1) notably for each nozzle,
- a hydraulic path of the ink including a stimulation chamber in hydraulic communication with one of the printing nozzles emitting a pressurized ink jet along an axis of this nozzle,
- internal means for stimulating the ink jet emitted by the nozzle mechanically coupled with the ink accommodated in the stimulation chamber, these means acting on the jet emitted by the nozzle in order to break up the jet in a controlled way, and
- means for recovering the ink which is not received by a printing substrate,
- a generator of electric control signals receiving a control signal and delivering to the stimulation means, stimulation signals,
- a layout of charging electrodes defining around the axis of the nozzle upstream and downstream areas, the downstream area being further away from the nozzle than the upstream area, upstream and downstream electrodes of this layout being connected to electric potential sources so as to maintain in one of the areas a potential equal to that of the ink found in the body of the printing head, and in the other one of these areas, a potential different from that of the ink found in the body of the printing head,
- a deflection electrode layout axially located downstream from the charging electrode layout characterised in that the generator of electric control signals delivers to the means for stimulating the signals causing controlled breaking up of the jet intermittently in an upstream breaking up position located in the upstream area, and also causing controlled breaking up of the jet or of segments of the jet continuously in a downstream breaking-up position, the continuous jet emitted by the nozzle thus being transformed after the downstream area into a continuous sequence, train, of electrically charged and non-charged drops.

The document FR-A1-2 906 755 (corresponding to documents WO-A1-2008/040777 and U.S. Pat. No. 8,162,450 B2) [2], describes how the drops are sorted in this technique under the effect of a variable field.

More specifically, this document, according to its claim 1, relates to a method for deflecting a liquid jet comprising:
- the formation of a conductive liquid jet leaving at a predetermined velocity (v) a nozzle of a pressurized chamber along a hydraulic trajectory (A),
- the generation of a variable electric field (E) along the hydraulic trajectory (A) by setting under a potential a succession, in the direction of the hydraulic trajectory (A), of several deflection electrodes insulated from each other and forming a network which extends along a plane of electrodes parallel to the hydraulic trajectory (A) on a network length (L), wherein the potential applied to each electrode of the network is variable and the potential applied to the whole of the electrodes of the network have zero space and time averages,
- the deflection of the jet by the electric field (E) by mobilization of charges within the jet.

Improvements to the technique which is the subject of documents [1] and [2] are described in documents [3], [4], and [5] which follow, to which reference is explicitly made here and which are introduced into the present description in their entirety:

The document FR-A1-2 952 851 (corresponding to documents WO-A1-2011/061331 and U.S. Pat. No. 8,540,350 B2) [3], describes how to avoid interactions between neighbouring nozzles by compensating for mechanical cross-talk.

More specifically, this document relates to a printer with a continuous ink jet comprising a printing head which is characterised in that it comprises means for compensating mechanical cross-talk between adjacent chambers, these means simultaneously transmitting to the transmission towards a stimulated chamber, of a stimulation pulse, a pulse for compensating mechanical cross-talk on each of the lines serving an actuator of a chamber adjacent to the stimulated chamber.

In particular, claim 1 of this document relates to a continuous ink jet printer including a printing head comprising:
- a plurality of stimulation chambers, aligned along an alignment axis of the chambers,
- a planar diaphragm, portions of which form a wall of each of the stimulation chambers,
- a plurality of nozzles, each being respectively in hydraulic communication with one of the stimulation chambers,
- at least one charging electrode and one deflection electrode situated downstream of the nozzles,
- a plurality of electromechanical actuators, each being mechanically bound respectively to each of the diaphragm portions forming a wall of each of the stimulation chambers,
- a plurality of stimulation lines, each intended to transmit stimulation pulses respectively to each of the different actuators,
- a device for processing data to be printed, receiving a carrier signal carrying data to be printed and delivering, depending on these data, stimulation pulses to the stimulation lines, characterised in that it further comprises means for compensating mechanical cross-talk between adjacent chambers, these means simultaneously transmitting to the transmission towards a stimulated chamber, a stimulation pulse on a stimulation line, a compensation pulse for mechanical cross-talk on each of the lines serving an actuator of the chamber adjacent to the stimulated chamber.

This document, according to its claim 2, also relates to a printing head of a printer with a continuous inkjet comprising:
- a plurality of stimulation chambers, aligned along an alignment axis of the chambers,
- a planar diaphragm, portions of which form a wall of each of the stimulation chambers,
- a plurality of nozzles each being respectively in hydraulic communication with one of the stimulation chambers,
- at least one charging electrode and one deflection electrode situated downstream of the nozzles,
- a plurality of electromechanical actuators, each being mechanically bound respectively to each of the portions of the diaphragm forming a wall of each of the stimulation chambers,
- a plurality of stimulation lines, each intended to transmit stimulation pulses respectively to each of the different actuators, characterised in that it further comprises means for compensating for mechanical cross-talk between adjacent chambers, these means simultaneously transmitting to the transmission to a stimulated chamber, a stimulation pulse on a stimulation line, a pulse for compensating for mechanical cross-talk on each of the lines serving an actuator of a chamber adjacent to the stimulated chamber.

This document, according to its claim 7, finally relates to a method for reducing the consequences of mechanical cross-talk between adjacent stimulation chambers of a printing head of a continuous ink jet printer including a planar diaphragm, portions of which form a wall of each of the stimulation chambers, at least one charging electrode and one deflection electrode located downstream from the nozzles, and electromechanical stimulation actuators of each chamber and a plurality of stimulation lines each intended to transmit stimulation pulses towards each of the various actuators, characterised in that simultaneously with the sending of a stimulation pulse towards an actuator of a stimulated chamber, compensation pulses are sent towards each of the chambers adjacent to the stimulated chamber, towards each of the actuators of a chamber adjacent to the stimulated chamber.

The document FR-A1-2 971 199 (corresponding to the documents WO-A1-2012/107461 and US-A1-2013/307891) [4], describes a method for controlling printing in which a change in the polarity between two neighbouring nozzles is carried out.

More specifically, this document, according to its claim 1, describes a method for controlling printing of a binary continuous ink jet printer provided with a printing head, or of a printing head of such a printer in order to print a pattern on a printing support by displacement with respect to the head, the head comprising:
a so-called multi-nozzle drop generator comprising:
a body including:
stimulation chambers each able to receive pressurized ink,
ejection nozzles, each in communication with a stimulation chamber and each able to eject an ink jet along its longitudinal axis, the nozzles being aligned along an alignment axis and laid out in a same plane,
actuators, each mechanically coupled with a stimulation chamber and able to cause upon a pulse command a breaking up of a jet ejected by a nozzle in communication with said chamber at a distance Lbr from the plane of the nozzles,
a deflection assembly laid out underneath the nozzles and including from the upstream side to the downstream side:
a shielding electrode,
a first dielectric layer adjacent to the shielding electrode,
at least one pair of deflection electrodes, each deflection electrode being surrounded on either side by a dielectric layer,
a method according to which:
pieces of information on the relative position of the support with respect to the head are determined,
the electrodes of a same pair are powered with an alternating voltage in phase opposition between each other,
pulses are sent to the actuators in order to form, from the breaking up of a jet ejected by a nozzle in communication with the chamber to which is mechanically coupled said actuator at a distance Lbr from the plane of the nozzles, drops not capable of being electrically charged by the deflection electrodes or jet segments subject to the electrostatic influence of the deflection electrodes,
the pulses are controlled so as to minimize the total electric charge on the jet segments, which is contained inside the electrostatic influence volume of the deflection electrodes.

This document, according to its claim 9, also relates to a binary continuous ink jet printer for applying said control method.

The document FR-A1-2 975 632 (corresponding to documents WO-A1-2012/163830 and US-A1-2014/168322) [5] describes how to increase the printing rate from 2 to 10 m/s by means of the drop generator.

More specifically, this document, according to its claim 1, describes a printing method of a multi-nozzle printer with a binary continuous ink jet or of a printing head of such a printer in order to print a pattern on a printing support by displacement with respect to the head, the head comprising:
a multi-nozzle drop generator comprising
a body including:
one or more pressurized chambers each capable of receiving pressurized ink,
ejection nozzles in hydraulic communication with a pressurized chamber and each capable of ejecting an ink jet having a velocity Vj along its longitudinal axis (A), the nozzles being aligned along an alignment axis and laid out in a same plane,
actuators, able to cause upon a pulse command a breaking-up of a jet ejected by a nozzle in order to form a succession of drops,
a method according to which the support relatively to the head has a velocity Vs, the distance between consecutive pixels in the displacement direction of the support is Dii, and according to which, by breaking-up the jet, drops of a first category and drops of a second category are formed, the drops of the first category each having a first volume, all the first volumes being substantially equal to each other, the drops of second category having second volumes not necessarily equal to each other but all the drops of the second category having a volume which is not equal to the volume of a drop of the first category,
the trajectories followed by the drops of first and second categories are differentiated by applying to at least one of the drop categories a deflection force capable of differentiating the trajectories of the drops of first category and of the drops of second category, the trajectory of the drops of first category encountering the printing support and the trajectory of the drops of second category encountering a gutter for recovering these drops,
a piece of information relating to the instants when the successive pixels to print run past a position where they may be printed, is generated,
for printing a black pixel followed by a white pixel, a droplet of first category is formed and a droplet of second category is formed, the cumulative formation duration of these drops of first and second categories being equal to or greater than the duration of the passage of a pixel.

No description of the specific inks applied in the printers, printing heads and methods of these documents nor any suggestion as to the criteria which should guide the selection of these inks exists in documents [1], [2], [3], [4] and [5].

Therefore, there exists a need for ink compositions and more generally for liquid compositions which are specifically adapted to the so-called "SPI" technique as defined above and which may notably be used in the processes, methods, printing heads and printers described in documents [1], [2], [3], [4] and [5], and explicitly discussed above in the present description.

The goal of the present invention is inter alia to meet this need for compositions for the marking, encoding or printing of all supports with an ink jet, and to provide liquid compositions which are specifically adapted to said so-called "SPI" technique, as defined above, and which may notably be used, implemented, applied in the processes, methods, printing heads and printers described in documents [1], [2], [3], [4] and [5] explicitly discussed above in the present description.

Another goal of the present invention is to provide a liquid composition, notably an ink composition, volatile, for the marking, the encoding or the printing of all supports, by a deflected continuous jet printing technique wherein the possible choices for the solvent compounds of this composition is considerably widened in order to have available a very great latitude in the formulation of these liquid compositions.

In particular, a goal of the present invention is to provide a liquid composition, notably an ink composition, volatile, for the marking, the encoding or the printing of all supports, by a deflected continuous jet printing technique, wherein solvents of low dielectric constant, non-dissociative, may be used without the quality of the printing being degraded.

DESCRIPTION OF THE INVENTION

This goal and others are achieved according to the invention with a liquid composition (composition of liquid), such as an ink composition, liquid at room temperature, specifically for printing with a binary deflected continuous jet printing technique wherein said liquid composition forms upon printing drops which are not charged by an electric field, which each have a zero electric charge, which each form a dipole under the effect of an electric field, and which are then deflected by said electric field, characterised in that said liquid composition comprises:

a) a solvent comprising one or more organic solvent compound(s) and optionally water, said solvent having globally (as a whole) a dielectric constant less (lower) than 15;

b) a binder;

c) one or more dye(s) and/or pigment(s);

and in that:

d) said liquid composition has an electrical conductivity at 20° C. less (lower) than or equal to 200 µS/cm, preferably less than or equal to 150 µS/cm, still preferably less than or equal to 100 µS/cm.

Generally, the solvent comprises at least one organic solvent compound having a dielectric constant less than 15, and further optionally one or more organic solvent compound(s) having a dielectric constant greater than or equal to 15 and/or water.

It should be pointed out that the dielectric constant of a mixture of solvents may ideally be measured or, failing this, may be estimated by means of the dielectric constants of the constituents and weighted by their mass proportions.

It should be pointed out, moreover, that the electrical conductivity is measured with a commercially available apparatus and according to principles well known to the man skilled in the art, for example described in the site: http://fr.wikipedia.org/wiki/Conductim%C3%A9trie.

The electrical conductivity may be measured in accordance with the following standard: ASTM D1125-14: "Standard Test Methods for Electrical Conductivity and Resistivity of Water".

The electrical conductivity may be measured for example with a commercially available conductivity meter of the Radiometer® Company.

Hereafter, when viscosity is concerned, it may be measured in accordance with the following standard: DIN 53019-1: "Measurements of viscosities and flow curves by means of rotational viscometers".

The dynamic viscosities may be measured for example using a coaxial cylinder viscometer, such as the coaxial cylinder viscometer of the "Couette" type of the Contraves® Company.

Hereafter, when particle sizes are concerned, they may be measured in accordance with the following standard: ISO 22412:2008.

The sizes of particles may be measured for example by means of a particle size analyzer of the Malvern® Company using the technique of "Quasi Elastic Light Scattering (QELS)", also called "photon autocorrelation".

Hereafter, when molecular mass is concerned, it may be measured by GPC (or steric exclusion chromatography) using polystyrene standards.

The term "liquid composition" covers not just inks but also liquids referred to as "functional liquids". A functional liquid may be any liquid enabling the deposition of a substance having a particular function, for example and without being exhaustive: a colouring, medical, drug, waterproofing, fixing, refractory, conducting, insulating, anti-counterfeiting function, notably for the pre-treatments and the post-treatments of textiles.

It may generally be considered that a functional liquid differs from an ink by the fact that an ink is in principle coloured, whereas a functional liquid is not necessarily so.

The aforementioned pre-treatments of textiles may generally be defined as treatments that serve to prepare the textile before printing, either to aid fixation, or to prevent it in places. The post-treatments of the aforementioned textiles may be various and are well known to the man skilled in the art.

By "room temperature" is generally meant a temperature from 5° C. to 30° C., preferably from 10° C. to 25° C., still preferably from 15° C. to 24° C., better from 20° C. to 23° C. It is understood that the ink is liquid at atmospheric pressure.

The term "binary" is well known in this field of the technique and has been clearly defined above.

The liquid composition according to the invention is a liquid composition specifically for printing with a very specific printing technique, namely a binary deflected continuous jet printing technique, wherein the liquid composition forms upon printing drops which are not charged by an electric field, each have a zero electric charge, each form a dipole under the effect of an electric field, and are then deflected by said electric field.

This technique is designated "SPI" for convenience.

The liquid composition according to the invention is a composition for any SPI technique, namely for all "SPI" processes, methods, and it may be implemented, applied, in all printers and printing heads operating according to this technique.

Thus, it is expressly indicated that the liquid composition according to the invention is a composition for the processes, methods, printers and printing heads as described in the documents [1], [2], [3], [4] or [5] cited above; for the processes, methods, printers and printing heads of these documents as they are explicitly discussed above in the present description; and for any processes, methods, printers, or printing heads defined by the combination of the characteristics of at least two processes, methods, printers or printing heads as described in the documents [1], [2], [3], [4] or [5] described above; or defined by the combination of at least two processes, methods, printers or printing heads as they are explicitly discussed above in the present description. As a combination, the combination of the documents [1] and [2] or of the documents [1] and [2] and of one or more of the documents [3] to [5] may be cited.

This signifies that the ink composition according to the invention is intrinsically formulated for printing with this specific "SPI" technique and that it is thus intrinsically different from a liquid composition for the "DOD" printing technique or the standard "CIJ" printing technique, namely a "CIJ" technique.

More exactly, the liquid composition according to the invention is firstly a liquid composition for printing with a "CIJ" deflected continuous jet printing technique, and because this simple fact it is clearly different from a liquid composition for printing with a drop-on-demand (DOD) printing technique.

Then, the liquid composition according to the invention forms upon printing drops which are not charged by an electric field, each have a zero electric charge, each forms a dipole under the effect of an electric field, whereas compositions for the standard "CIJ" technique form charged droplets.

Finally, the liquid composition according to the invention is printed by using an electric field for deflecting the drops, which there again makes it clearly different from a liquid composition for the DOD technique.

The liquid composition according to the invention is characterised in that it further has simultaneously all the characteristics a), b), c) and d).

A liquid composition, such as an ink composition, which has simultaneously all the characteristics a), b), c) and d) has never been described or suggested by the prior art.

It has been found that the liquid composition according to the invention, which has all these four characteristics, was particularly well suited for the specific so called "SPI" printing technique defined above.

These characteristics further differentiate the liquid composition according to the invention from the liquid compositions for the "DOD" printing technique or the standard "CIJ" printing technique and give the liquid composition according to the invention advantageous properties as compared with the liquid compositions for the "DOD" printing technique or the "CIJ" printing technique. Thus, according to the characteristic, feature, a), the liquid composition, such as an ink composition, according to the invention comprises a solvent comprising one or more organic solvent compound(s) and optionally water, said solvent having globally (as a whole) a dielectric constant less than 15.

Generally, the solvent comprises at least one organic solvent compound having a dielectric constant less than 15, and further, optionally, one or more organic solvent compound(s) having a dielectric constant greater than or equal to 15 and/or water.

The liquid compositions, such as ink compositions, for the "CIJ" printing technique do not comprise such a solvent having globally a dielectric constant less than 15.

Moreover, according to the characteristic, feature, d), the liquid composition according to the invention has an electrical conductivity at 20° C. less than or equal to 200 μS/cm, preferably less than or equal to 150 μS/cm, still preferably less than or equal to 100 μS/cm, whereas the liquid compositions for the "CIJ" printing technique have an electrical conductivity at 20° C., greater than or equal to 500 μS/cm, preferably greater than 500 μS/cm.

The liquid composition according to the invention, such as an ink composition, is a liquid composition specifically for printing with a binary deflected continuous jet printing technique known as the SPI technique. Yet, the SPI technique generally requires a minimum conductivity. Consequently, the minimal, minimum value, of the conductivity of the liquid composition, such as the ink composition, according to the invention, at 20° C., is generally from 1 to 10 μS/cm. Put another way, the liquid composition according to the invention generally has an electrical conductivity at 20° C. greater than or equal to 1, 2, 3, 4, 5, 6, 7, 8, 9 or 10 μS/cm.

Thus the conductivity of the liquid composition according to the invention may be from 1 to 200 μS/cm (1 and 200 μS/cm may be excluded, i.e. the range is then: greater than 1 μS/cm and less than 200 μS/cm; or 1 or 200 μS/cm may be excluded; or 1 and 200 μS/cm may be included), notably from 2 to 150 μS/cm (2 and 150 μS/cm may be excluded, i.e. the range is then: greater than 2 μS/cm and less than 150 μS/cm; or 2 or 150 μS/cm may be excluded; or 2 and 150 μS/cm may be included), still notably from 5 to 100 μS/cm (5 and 100 μS/cm may be excluded, i.e. the range is then: greater than 5 μS/cm and less than 100 μS/cm; or 5 or 100 μS/cm may be excluded; or 5 and 100 μS/cm may be included), or even 10 to 100 μS/cm (10 and 100 μS/cm may be excluded, i.e. the range is then: greater than 10 μS/cm and less than 100 μS/cm; or 10 or 100 μS/cm may be excluded; or 10 and 100 μS/cm may be included).

The liquid composition according to the invention generally has a viscosity of 2 to 10 mPa·s.

It has been demonstrated, in a surprising manner, while searching for liquid compositions specifically suitable for the so-called "SPI" technique, that, precisely on account of the so-called 'SPI' technique for which the liquid compositions according to the invention are designed, said compositions could have advantageous characteristics compared to the liquid compositions for the "DOD" printing technique or the "CIJ" printing technique.

It has also been demonstrated, in a surprising manner, that the liquid compositions according to the invention, while enabling a very wide latitude in their formulation notably as regards the solvent, remain printable even at low electrical conductivities, namely less than or equal to 200 μS/cm, preferably less than or equal to 150 μS/cm, still preferably less than or equal to 100 μS/cm.

In the standard "CIJ" printing technique, the net charge taken by the drops is induced by an electrostatic influence at the surface of the jet in the same way as the charge of a capacitor.

This charge depends on the duration of the charge voltage and also depends on the electrical conductivity of the ink. The net electric charge provided varies over time until a final asymptotic value is obtained. When the conductivity is insufficient, this final value is not obtained in time and this charge will depend considerably on the instant when the breaking of the jet takes place.

On the contrary, in the so-called "SPI" technique, as the net charge of the drops is zero, the accuracy of the breaking-up instant is not critical.

It has thus been demonstrated, according to the invention, that liquid compositions such as inks, of much lower electrical conductivity than liquid compositions for the standard "CIJ" technique may be used while giving markings or prints with excellent qualities.

As has already been mentioned above, the electrical conductivity at 20° C. of the liquid composition according to the invention is no longer greater than or equal to 500 µS/cm, like that of liquid compositions for the standard "CIJ" printing technique, but less than or equal to 200 µS/cm.

As has also already been indicated above the electrical conductivity is provided to the liquid compositions, such as ink compositions, for the standard "CIJ" printing technique by salts. But these salts can only provide conductivity if the solvents are dissociative for the ions and these salts have a negative impact on the stability of the liquid composition.

The solvents of the liquid compositions, such as ink compositions, for the standard "CIJ" printing technique must have a high dielectric constant greater than 15 in order to be sufficiently dissociative for the ions.

According to the invention, since the electrical conductivity of the liquid composition is low, solvent compounds of low dielectric constant, less than 15, become usable whereas they were not usable with standard CIJ compositions.

The possible choice for these solvent compounds is thus considerably widened. In particular, the number of volatile solvent compounds that may be selected is considerably increased, because said volatile solvent compounds no longer have to be selected as was the case until now uniquely from only solvent compounds with high dielectric constant.

These solvent compounds can thus be selected as a function of criteria other than their dielectric constant, such as their absence of harmfulness.

In addition, the amount of conductivity salt in the liquid composition according to the invention is generally less than the amount of conductivity salts in compositions for standard CIJ (see later), which eliminates the negative effects on the stability of the liquid composition due to said salts. In other words, the compositions according to the invention are compositions which contain fewer salts and which are thus more stable.

Advantageously, solvent compounds less polar than ketones, water, amides or alcohols may be used and may thus make it possible to obtain compositions, formulations of which the harmfulness is less than that of compositions that contain ketones or amides for example.

In the "CIJ" technique, liquids of high densities, specific gravities, are not printable because the deflection force of electrical origin is insufficient to deflect drops of high mass, due to an inertia effect.

Conversely, it has been demonstrated according to the invention that in the so-called "SPI" technique, the printed drops are those that are not deflected, and drops of high densities in the range according to the invention are thus printable.

Advantageously, the liquid composition according to the invention may comprise solid particles, such as particles of pigments or particles of binder polymer in dispersion.

Preferably, the maximum size of the solid particles is from 2 to 10 µm, preferably from 2 to 5 µm.

The average or maximum size of the particles is measured using a laser particle size analyzer, either by quasi-elastic light scattering as with the Zetasizer Nano-S® of the Malvern® Company, or by light diffraction as with the Mastersizer® of the Malvern® Company.

There again, this is a characteristic, feature, that differentiates the liquid composition according to the invention from liquid compositions for the "DOD" printing technique or for the standard "CIJ" printing technique and confers to the liquid composition according to the invention advantageous properties as compared with liquid compositions for the "DOD" printing technique or for the "CIJ" printing technique.

Indeed, the solid particles, such as those contained in the liquid compositions for the standard "CIJ" printing technique, have a much smaller maximum size, of less than 2 mm.

In the standard "CIJ" printing technique, the net charge taken by the drops depends on perfect synchronism between the time slot of the charging electric field and the instant when breaking-up occurs. The large particles perturb the breaking-up and make it random, whence a variable loaded charge, whence poor positioning of the drops after deflection and therefore poor printing.

On the contrary, in the so-called "SPI" technique, as the net charge of the drops is zero, the accuracy of the breaking-up instant is not critical. Therefore it has been demonstrated according to the invention that solid particles, such as pigments, much larger than in the liquid compositions for the standard "CIJ" technique may be used in the liquid composition according to the invention without posing any problem during printing and by producing markings or treatments with excellent qualities. The maximum size of the solid particles of the liquid composition according to the invention is no longer limited and is only limited by the size of the nozzle.

Moreover, the sedimentation problems observed with large particles become manageable in the compositions according to the invention by adjusting their viscosity.

In other words, according to the invention, the "large" solid particles become "printable" while they were not printable with compositions for standard CIJ.

Advantageously, when the liquid composition according to the invention further comprises at least one polymer solubilized (for example as a binder polymer) in the solvent of the liquid composition, said polymer then has a weight average molecular mass of more than 70,000 Daltons, preferably from 75,000 to 200,000 Daltons, still preferably from 80,000 to 200,000 Daltons.

It should be noted that when a polymer is solubilized in a solvent, such as the solvent of the liquid composition according to the invention, this necessarily implies that it is soluble in the solvent considered.

There again, this is a characteristic, feature, which differentiates the liquid composition according to the invention from the liquid compositions for the "DOD" printing technique or for the standard "CIJ" printing technique and gives the liquid composition according to the invention advantageous properties as compared with liquid compositions for the "DOD" printing technique or for the "CIJ" printing technique Indeed, the polymers which the liquid compositions for the "CIJ" printing technique contain have a molecular mass which does not exceed 70,000.

Similarly to what was discussed above for solid particles of large size, the liquid composition according to the invention may contain polymers with very long chains without there occurring problems during printing and by giving markings or treatments with excellent qualities.

In other words, according to the invention, polymers with a very long chain become "printable" while they were not printable with the compositions for standard CIJ.

The solvent comprises one or more solvent compound(s), selected from among organic solvent compound(s) and optionally water.

It should be noted that the liquid composition, for example the ink composition, according to the invention generally comprises a very small amount of water, generally less than 10% by weight, preferably less than 5%, still preferably less than 1% by weight, compared to the total weight of the ink composition.

The liquid composition, for example the ink composition, according to the invention may even be considered as being essentially exempt of water (0% water).

In fact, the water present in the composition is only added water found as an impurity in the various components of the liquid, for example of the ink. The higher the degree of purity of the selected components, the lower will be the water content.

The small content or absence of water in the liquid composition, for example the ink composition, according to the invention promotes the formation of the liquid film, for example of the ink film when the binders and other dyes of the composition are insoluble in water, thereby improving the resistance and adherence properties of the liquid, for example of the ink.

Advantageously, said organic solvent compound(s) of the solvent is (are) selected, for example, from alcohols, in particular, low molecular weight alcohols, for example, aliphatic alcohols such as ethanol; ketones, preferably low molecular weight ketones; ethers of alkylene glycols; esters of alkylene glycols and esters of alkylene glycol ethers, such as acetates; dimethyl formamide; N-methyl pyrrolidone; acetals; esters; linear or cyclic ethers; cyclic or linear aliphatic hydrocarbons; aromatic hydrocarbons; and carbonates such as propylene carbonate, ethylene carbonate and dimethyl and diethyl carbonates; and mixtures thereof.

By low molecular weight alcohols and ketones is generally meant alcohols and ketones with 8 carbon atoms or fewer than 8 carbon atoms.

Preferably, this or these solvent compound(s) has (have) the property of dissolving the other ingredients of the ink, notably the binder, the colorant materials, the additives, etc.

The alcohols will preferably be selected from linear or branched aliphatic alcohols with 1 to 8 carbon atoms, such as methanol, ethanol, 1-propanol, 2-propanol, n-butanol, 2-butanol, tert-butanol, etc.

The ketones will preferably be selected from ketones with 3 to 10 carbon atoms, such as acetone, butanone (methyl ethyl ketone), 2-pentanone (methyl propyl ketone), 3-methyl 2-butanone (methyl isopropyl ketone) and 4-methyl 2-pentanone (methyl isobutyl ketone).

The ethers of alkylene glycols are preferably selected from mono-alkyl (C1-C6 alkyl group) or dialkyl (C1-C6 alkyl groups) alkylene glycol ethers comprising from 1 to 10 carbon atoms in the alkylene chain, preferably these are ethylene or propylene glycol ethers, such as methoxy propanol.

The esters of alkylene glycols and the esters of alkylene glycol ethers are preferably selected from esters of the latter with saturated aliphatic carboxylic acids with 1 to 6 carbon atoms, such as formic acid, acetic acid, propionic acid, butyric acid, valeric acid and caproic acid.

For example, methoxypropyl acetate, butyldiglycol acetate, etc. may be cited.

The esters are preferably selected from low molecular mass esters such as formates, acetates, propionates or butyrates of alcohols with 1 to 10 carbon atoms.

The acetals are preferably selected from low molecular mass acetals such as ethylal and methylal.

The ethers are preferably selected from low molecular mass ethers such as dioxolane or tetrahydrofuran.

The man skilled in the art may easily identify from the solvent compounds listed above those for which the dielectric constant is less than 15.

Organic solvent compounds for which the dielectric constant is less than 15 may be found for example in the following table: http://www.atomer.fr/1/1bcsu.html or instead in the following table http://www.stenutz.eu/chem/solv23.php.

Or instead a list of the most common solvents with their dielectric constant may be found at this address: http://depts.washington.edu/cooptic/linkfiles/dielectric_chart%5B1%5D.pdf.

In the same way, the man skilled in the art could easily identify among the solvent compounds listed above those which are volatile and those which are non-volatile.

By "volatile organic solvent compound" is generally meant that said compound has an evaporation rate greater than 0.5 on the scale where butyl acetate has an evaporation rate equal to 1.

According to a preferred embodiment, the solvent of the liquid composition, such as an ink composition, according to the invention comprises a majority amount by weight compared to the total weight of the solvent (50% by weight compared to the total weight of the solvent or more) of at least one organic solvent compound having a dielectric constant less than 15; preferably the solvent comprises 90% by weight or more, still preferably 95% by weight or more, better 100% by weight compared to the total weight of the solvent of said organic solvent compound having a dielectric constant less than 15, that is to say that the solvent is constituted (consists of) of said organic solvent compound having a dielectric constant less than 15.

The solvent of the liquid composition according to the invention when it is not constituted of (it does not consist of) said organic solvent compound having a dielectric constant less than 15 according to the invention may further optionally comprise one or more organic solvent compound(s) having a dielectric constant greater than or equal to 15 and/or water.

The solvent of the liquid composition, such as an ink composition, according to the invention according to the preferred embodiment described above may then further comprise a minority amount by weight compared to the total weight of the solvent (less than 50% by weight compared to the total weight of the solvent) of at least one organic solvent compound having a dielectric constant greater than or equal to 15 and water; preferably the solvent comprises less than 10% by weight, still preferably less than 5% by weight, compared to the total weight of the solvent, of said solvent compound having a dielectric constant greater than or equal to 15 and of water.

Preferably, the solvent is exempt (0%) of organic solvent compound(s) having a dielectric constant greater than or equal to 15 and of water.

Advantageously, the organic solvent compound(s) of which the dielectric constant is less than 15 is (are) selected from volatile organic solvent compounds.

Preferably, the solvent is constituted of (consists of) one or more volatile organic solvent compound(s), still preferably the solvent is constituted of (consists of) one or more volatile organic solvent compound(s) of which the dielectric constant is less than 15.

Among preferred volatile organic solvent compounds of which the dielectric constant is less than 15 may be cited dioxolane, methylal, diethoxymethane (or ethylal), esters such as ethyl, propyl, isopropyl, or butyl acetates, and dimethyl carbonate.

The solvent of the liquid composition according to the invention may be constituted of (consist of) one or more among these preferred volatile organic solvent compounds, the dielectric constant of which is less than 15, for example the solvent of the liquid composition according to the invention may be constituted of (consist of) ethyl acetate, or of dioxolane, or of a mixture of dioxolane and ethylal, or of a mixture of dioxolane and dimethyl carbonate.

In the composition according to the invention, the solvent generally represents at least 20% by weight of the total weight of the liquid composition, preferably the solvent represents from 30% to 90% by weight, still preferably from 60% to 80% by weight, of the total weight of the liquid composition.

In order to be coloured or opaque, the liquid composition, for example the ink composition, according to the invention further comprises colorant materials such as dyes and pigments.

The dye(s) and/or pigment(s) may be selected from all dyes or pigments suitable for the desired use, known to the man skilled in the art, some of these pigments or dyes have already been cited above.

These dyes and pigments may be notably selected from dyes and pigments already known to the man skilled in the art for the formulation of inks for the "CIJ" deflected continuous jet printing technique.

It has been seen above that solid particles such as the pigments that the liquid composition according to the invention optionally contains may have specific particle sizes.

Said dye(s) may be selected from among the dyes known under the name of "C.I. Solvent Dyes", and said pigment(s) may be selected from organic and mineral pigments, notably from pigments known under the name of "C.I. Pigments", and from solid particles not referenced in the "Colour Index" (C.I.) such as particles of metals or alloys or mixtures of metals such as particles of copper and/or silver, particles of metal oxides, particles of ceramics, particles of refractory mineral compounds, and particles of any other mineral compound, preferably said pigment(s) is (are) selected from titanium oxide and carbon black.

As examples of the most common pigments and dyes may be cited C.I. Solvent Black 3, 7, 27, 28, 29, 35, 48, 49, C.I. Solvent Blue 38, 44, 45, 70, 79, 98, 100, 129, C.I. Solvent Red 8, 49, 68, 89, 124, 160, 164, C.I. Solvent Yellow 83:1, 126, 146, 162, C.I. Solvent Green 5, C.I. Solvent Orange 97, C.I. Solvent Brown 20, 52, C.I. Solvent Violet 9, dispersions of Pigment Blue 15:1, 15:3, 60, of Pigment Green 7, of Pigment Black 7, of Pigment Red 48:2, 144, 149, 166, 185, 202, 208, 214, 254, of Pigment Violet 19, 23, of Pigment Yellow 17, 83, 93, 139, 151, 155, 180, 191, of Pigment Brown 23, 25, 41, or of Pigment White 6.

Preferred dyes are C.I. Solvent Black 27 and C.I. Solvent Black 29.

Preferred pigments are Pigment White 6, Pigment Black 7, Pigment Blue 60, Pigment Red 202 and Pigment Green 7.

The total amount of dye(s) and/or of pigment(s) is generally from 0.05% to 25% by weight, preferably, from 1% to 20%, still preferably from 3% to 10% of the total weight of the liquid composition.

Preferably a dye for which the solubility in water is the smallest, which is insoluble in water, will be selected.

By dye insoluble in water is generally meant a dye which, added at 1% by weight in demineralized water, does not cause coloration of the water, visible to the naked eye.

The liquid composition according to the invention may further include a binder constituted of (consisting of) one or more binder polymers.

These binder polymers may be selected from those already known to the man skilled in the art to formulate inks for CIJ type ink jet.

It was seen above that the polymers which the liquid composition according to the invention optionally contains may have specific molecular masses.

Advantageously, this or these binder polymer(s) may be selected from (meth)acrylic, vinylic, ketonic, hydroxyaromatic, cellulosic, styrenic, epoxy polymers, polyurethanes, styrene-acrylates, alkoxysilanes, and combinations of two or more thereof.

Advantageously, the binder represents from 1% to 45% by weight, preferably from 5% to 25% by weight, still preferably from 10% to 20% by weight, of the total weight of the liquid composition according to the invention expressed as solid material.

Advantageously, the weight ratio binder/dye(s) and/or pigment(s) may be greater than or equal to 0.5, preferably greater than or equal to 1.

A minimum value of this ratio of 0.5, preferably 1, is generally considered as necessary in order that the binder plays its role effectively, that is to say that it has a real function by providing sufficient mechanical strength.

The liquid composition, for example composition, according to the invention may, moreover, comprise one or more plastifier(s) (of the polymer(s) of the binder) selected, for example, from plastifiers known to the man skilled in the art and selected as a function of the binder used.

As plastifier may be cited, for example, thermoplastic polyurethanes, phthalates, adipates, citrates and esters of citric acid, alkyl phosphates, glycerol, lactic acid, oleic acid, polypropylene glycol, triglycerides of fatty acids, levulinic acid; and mixtures thereof.

The plastifier(s) is (are) generally present in an amount of at least 0.05%, preferably from 0.1% to 20% by weight, of the total weight of the liquid composition, for example ink composition.

The composition according to the invention may further, optionally, comprise at least one conductivity salt, except if another ingredient of the ink such as a dye, pigment, or other, is itself an ionizable compound such as a salt that can provide conductivity when it is dissociated, and gives sufficient conductivity to the ink so that there is no need to add a conductivity salt per se, as is notably the case of the compounds known under the name "CI. Solvent Black 27, 29, 35 and 45", already cited.

However, it will sometimes be necessary to include, in the liquid composition, for example ink composition, according to the invention at least one conductivity salt per se, different from ionizable compounds, such as the dyes, pigments and other ingredients cited above.

By "conductivity salt" is generally meant a salt which provides electrical conductivity to the liquid composition, for example ink composition.

This conductivity salt may thus be selected from salts of alkaline metals such as lithium, sodium, potassium, salts of alkaline-earth metals such as magnesium and calcium, and single or quaternary ammonium salts; said salts being in the form of halides (chlorides, bromides, iodides, fluorides), perchlorates, nitrates, thiocyanates, formiates, acetates, sulfates, propionates, trifluoroacetates, triflates (trifluoromethane sulfonates), hexafluorophosphates, hexafluoroantimonates, tetrafluoroborates, picrates, carboxylates and sulfonates, etc.

If the markings obtained with the liquid composition, for example ink composition, according to the invention have to be resistant to water, this or these conductivity salt(s) will be selected from those which are insoluble in water (i.e. generally, for which the solubility in water is less than 0.5% by weight), such as quaternary ammoniums with a fatty chain and hexafluorophosphates or hexafluroantimonates.

This at least one conductivity salt will therefore be present, if required, in the liquid composition so as to impart to the composition the above conductivity: preferably, its (their) amount is from 0.01% to 10% by weight, still preferably from 0.01% to 1% by weight, and better from 0.01% to 0.05% by weight of the total weight of the liquid composition.

Because the liquid composition according to the invention has conductivity generally below that of liquids, such as inks, for the "CIJ" technique, the amount of conductivity salt optionally added will generally be smaller than in these liquids for "CIJ".

The composition according to the invention may further comprise one or several additives selected from compounds which improve the solubility of some of its components, the printing quality, the adherence, or further the control of the wetting of the liquid, for example ink, on various supports.

The additive(s) could be selected, for example, from anti-foaming agents, chemical stabilisers, UV stabilisers; surfactants, agents inhibiting corrosion by salts, notably by conductivity salts, bactericides, fungicides and biocides, pH regulating buffers, etc.

The additive(s) is (are) used at very small doses, generally less than or equal to 5% and sometimes as low as 0.01%, depending on whether these are anti-foaming agents, stabilizers or surfactants.

The man skilled in the art could easily identify among these additives those that are necessary for the application depending on the support to mark.

The invention also relates to the use of the liquid composition, such as an ink composition, according to the invention, as described above, in a printer or printing head implementing, applying, a binary deflected continuous jet printing technique, wherein said liquid composition forms upon printing drops which are not charged by an electric field, which each have a zero electric charge, which each form a dipole under the effect of an electric field, and which are then deflected by said electric field.

This printing technique is thus the so-called "SPI" technique.

This technique, this printer and this printing head are as described in the documents [1], [2], [3], [4], or [5] cited above or in any combination thereof. They involve notably the printers and printing heads of these documents taken alone or in combination such as they have been explicitly described above in the present document.

The invention also relates to a method of printing, and/or treating, and/or marking and/or encoding substrates, supports or objects, for example, porous or non-porous, by projection on these substrates, supports or objects a liquid composition, such as an ink composition, with a binary deflected continuous jet printing technique, wherein said liquid composition forms upon printing drops which are not charged by an electric field, which each have a zero electric charge, which each form a dipole under the effect of an electric field, and which are then deflected by said electric field, characterised in that said liquid composition, such as an ink composition, is the liquid composition, such as an ink composition, according to the invention as has been described above.

This printing technique is thus the so-called "SPI" technique.

This technique is as described in documents [1], [2], [3], [4] or [5] mentioned above taken alone or as a combination through processes, methods, printers and printing heads implementing, applying, this technique. This is notably the printing technique of these documents taken alone or as a combination such as explicitly discussed above herein through the discussion of processes, methods, printers and printing heads implementing, applying, this technique.

The object of the invention is further a substrate, support or object, for example, a porous or non-porous substrate, support or object, provided with a printing, and/or a treating and/or a marking and/or an encoding obtained by drying and/or absorption (in the substrate or support) of the liquid composition, such as an ink composition, according to the invention, as described above.

Said printing, and/or said treating, and/or said marking and/or said encoding generally comprises essentially all the non-volatile solid materials, such as the pigment of the liquid composition and/or the binder, and it is obtained by evaporation and/or absorption in the substrate, of essentially the totality of the other volatile or migrating constituents of the liquid composition, for example the ink composition, such as the carrier, vehicle.

This substrate may be made of metal, for example, made of aluminium, made of steel (beverage cans); made of glass (glass bottles); made of ceramic; made of a material containing cellulose such as cellophane, paper, optionally coated or glossy paper, cardboard or wood; made of an organic polymer, notably made of a thermoplastic polymer ("plastic"), notably in the form of a film, selected for example from PVDCs, PVCs, polyesters, PETs, polyolefins, such as polyethylenes (PE), polypropylenes (PP); poly (methyl methacrylate) PMMA also called "Plexiglas"; made of fabric; made of textile; made of natural or synthetic rubber; or made of any other non-porous or porous substance; or made of a composite of several of the previous materials.

The substrate may be made of cotton, made of spun rayon ("Fibranne"), made of viscose, polyester, wool, or mixtures thereof.

Prints, and/or treatments, and or markings, and or encodings of excellent quality on all substrates, and in particular on flexible or even very flexible substrates are obtained.

DETAILED DESCRIPTION OF PARTICULAR EMBODIMENTS

The invention will be better understood on reading the following description of embodiments of the invention, given as illustrative and non-limiting examples.

EXAMPLES 1 to 4

In all these examples, ink compositions according to the invention are prepared.

These ink compositions comprise the ingredients mentioned in Table I, in the proportions mentioned in Table I.

These compositions are generally prepared by simply mixing the ingredients.

In Table I, according to the ink compositions, are also shown the dielectric constants of the constituent solvents, the conductivity of the compositions (in μS/cm) and the viscosity (in mPa·s=cPs) and finally it is specified whether the inks were suitable or not for printing with the deflected continuous jet technique (CIJ) or with the so-called "SPI" technique.

TABLE I

INK COMPOSITIONS

| Constituents (percentages by mass) | Dielectric constant of the solvent | Ex. 1 | Ex. 2 | Ex. 3 | Ex. 4 |
|---|---|---|---|---|---|
| Colour of the ink | | Black | Blue | Black | White |
| Dioxolane | 7.1 | | 91.6 | 42.5 | 40 |
| Ethyl acetate | 6 | 87.4 | | | |
| Dimethyl carbonate | 3.09 | | | | 40 |
| Ethylal (diethoxymethane) | 2.5 | | | 42.5 | |
| Vinnol ® H1436 | | | 2.4 | | |
| Vinnol ® E1545M | | 7.6 | | | |
| CAB551.0.1 | | | | 4.5 | |
| Neocryl ® B813 | | | | | 10.5 |
| Valifast ® 3808 | | 5 | | | |
| Oil black 860 | | | | 5 | |
| Microlith ® Blue 6480-K | | | 4 | | |
| $TiO_2$ at 75% in an acrylic resin | | | | | 10 |
| KSCN | | | 0.5 | | |
| $KPF_6$ | | | | 1 | |
| TriEthyleneGlycolDiMethylEther | | | 1.5 | | |
| PolyEthyleneGlycolDiMethylEther 500 | | | | 3 | |
| 1-Butyl-3Methyl-Imidazolium-$PF_6$ | | | | | 2 |
| Dow Corning ® 57 | | | | 0.1 | |
| Viscosity (mPa · s = cPs) | | 6.4 | 3.3 | 4.9 | 8 |
| Electrical conductivity (µS/cm) | | 117 | 78 | 75 | 76 |
| Observations | | | | | |
| "CIJ" printing | | — | no | no | no | no |
| "SPI" printing | | — | yes | yes | yes | yes |

The electrical conductivity was measured with a conductivity meter available commercially from the Radiometer® Company.

The dynamic viscosities were measured using a coaxial cylinder viscometer of the "Couette" type from Contraves® Company.

The nature of the components of the inks is specified below:

Vinnol ® H1436: vinyl resin from the Wacker ® Company.
Vinnol ® E1545M: vinyl resin from the Wacker ® Company.
CAB551.0.1: cellulose acetobutyrate from the Eastman ® Company.
Neocryl ® B813: acrylic resin from the DSM ® Company.
Valifast ® 3808 C.I.: Solvent Black 29 from the Orient Chemicals ® Company.
Oil black 860: C.I.: Solvent Black 3 from the Orient Chemicals ® Company.
Microlith ® Blue 6480-K: Pigment from the BASF ® Company.
$TiO_2$ at 75% in an acrylic resin from the Flint ® Company.
1-Butyl-3-Methyl-Imidazolium-$PF_6$: ionic liquid.
Dow Corning ® 57: silicone additive from the Dow Corning ® Company.

The compositions of examples 1 to 4 gave suitable printings on plastic films in a prototype printer applying the so-called "SPI" technique having a nozzle diameter of 40 µm.

It furthermore turned out that it was impossible to use the compositions of examples 1 to 4 in a printer implementing the so-called "CIJ" technique and a fortiori to obtain a suitable printing.

The invention claimed is:

1. Liquid composition said liquid composition being a liquid composition specifically for printing with a binary deflected continuous jet printing technique wherein said liquid composition forms upon printing drops which are not charged by an electric field, which each have a zero electric charge, which each form a dipole under the effect of an electric field, and which are then deflected by said electric field, characterised in that said liquid composition comprises:
 a) a solvent comprising one or more organic solvent compound(s) and optionally water, said solvent having globally a dielectric constant less than 15;
 b) a binder;
 c) one or more dyes and/or pigments;
 and in that:
 d) said liquid composition has an electrical conductivity at 20° C. from 1 to 200 µS/cm.

2. Liquid composition according claim 1, which has an electrical conductivity at 20° C. from 2 to 150 µS/cm.

3. Liquid composition according to claim 1, wherein the organic solvent compound(s) of the solvent is (are) selected from alcohols; ketones; ethers of alkylene glycols; esters of alkylene glycols and esters of alkylene glycol ethers; dimethyl formamide; N-methyl pyrrolidone; acetals; esters; linear or cyclic ethers; cyclic or linear aliphatic hydrocarbons; aromatic hydrocarbons; carbonates; and mixtures thereof.

4. Liquid composition according to claim 3, wherein the alcohol is an alcohol of low molecular weight.

5. Liquid composition according to claim 4, wherein the alcohol of low molecular weight is an aliphatic alcohol.

6. Liquid composition according to claim 4, wherein the aliphatic alcohol is ethanol.

7. Liquid composition according to claim 3, wherein ketone is a ketone of low molecular weight.

8. Liquid composition according to claim 3, wherein the ester of alkylene glycol and of alkylene glycol ether is an acetate.

9. Liquid composition according to claim 3, wherein the carbonate is selected from propylene carbonates, ethylene carbonates, dimethyl carbonates and diethyl carbonates.

10. Liquid composition, according to claim 1, wherein the solvent comprises a majority amount by weight compared to the total weight of the solvent of at least one organic solvent compound having a dielectric constant less than 15.

11. Liquid composition according to claim 10, wherein the solvent further comprises a minority amount by weight compared to the total weight of the solvent of at least one organic solvent compound having a dielectric constant greater than or equal to 15 and of water.

12. Liquid composition according to claim 1, wherein the organic solvent compound(s) of which the dielectric constant is less than 15 is (are) selected from volatile organic solvent compounds.

13. Liquid composition according to claim 12, wherein the volatile organic solvent compounds of which the dielectric constant is less than 15 are selected from dioxolane, methylal, diethoxymethane, and esters.

14. Liquid composition according to claim 13, wherein the esters are selected from the group consisting of ethyl, propyl, isopropyl, or butyl acetates; and dimethyl carbonate.

15. Liquid composition according to claim 1, wherein the solvent consists of one or more volatile organic solvent compound(s).

16. Liquid composition according to claim 15, wherein the one or more volatile organic solvent compound(s) has a dielectric constant less than 15.

17. Liquid composition according to claim 16, wherein the volatile organic solvent compounds of which the dielectric constant is less than 15 are selected from dioxolane, methylal, diethoxymethane, and esters.

18. Liquid composition according to claim 17, wherein the esters are selected from ethyl esters, propyl esters, isopropyl esters, or butyl esters.

19. Liquid composition according to claim 17, wherein the esters are selected from the group consisting of ethyl, propyl, isopropyl, or butyl acetates; and dimethyl carbonate.

20. Liquid composition according to claim 1, wherein the solvent represents at least 20% by weight of the total weight of the liquid composition.

21. Liquid composition according to claim 1, wherein said dye(s) is (are) selected from the dyes known under the name of C.I. Solvent Dyes, and said pigment(s) is (are) selected from organic and mineral pigments known under the name of C.I. Pigments, and from solid particles not references in the "Colour Index" (CI).

22. Liquid composition according to claim 18, wherein said Solvent Dye(s) is (are) selected from C.I. Solvent Black 3, 7, 27, 28, 29, 35, 48, 49, C.I. Solvent Blue 38, 44, 45, 70, 79, 98, 100, 129, C.I. Solvent Red 8, 49, 68, 89, 124, 160, 164, C.I. Solvent Yellow 83:1, 126, 146, 162, C.I. Solvent Green 5, C.I. Solvent Orange 97, C.I. Solvent Brown 20, 52, and C.I. Solvent Violet 9, and said C I. Pigment(s) is (are) selected from among dispersions of Pigment Blue 15:1, 15:3, 60, of Pigment Green 7, of Pigment Black 7, of Pigment Red 48:2, 144, 149, 166, 185, 202, 208, 214, 254, of Pigment Violet 19, 23, of Pigment Yellow 17, 83, 93, 139, 151, 155, 180, 191, of Pigment Brown 23, 25, 41, or of Pigment White 6.

23. Liquid composition according to claim 21, wherein said organic and mineral pigments are selected from pigments known under the name of "C.I. Pigments".

24. Liquid composition according to claim 21, wherein said solid particles are selected from the group consisting of particles of metals or alloys or mixtures of metals, particles of metal oxides, particles of ceramics, particles of refractory mineral compounds, and particles of any other mineral compound.

25. Liquid composition according to claim 24, wherein said particles of metals or alloys or mixtures of metals are selected from particles of copper and/or silver.

26. Liquid composition according to claim 1, wherein said pigments are selected from titanium oxide and carbon black.

27. Liquid composition according to claim 1, including in total from 0.05 to 25% by weight of dye(s) and/or pigment(s) compared to the total weight of the liquid composition.

28. Liquid composition according to claim 1, wherein the binder consists of one or more binder polymer(s).

29. Liquid composition according to claim 28, wherein the binder represents from 1% to 45% by weight of the total weight of the liquid composition.

30. Liquid composition according to claim 28, wherein the one or more binder polymer(s) is (are) selected from (meth)acrylic, vinylic, ketonic, hydroxyaromatic, cellulosic, styrenic, epoxy polymers, polyurethanes, styrene-acrylates, alkoxysilanes, and combinations of two or more thereof.

31. Liquid composition according to claim 1, wherein the weight ratio of the binder/dye(s) and/or pigment(s) is greater than or equal to 0.5.

32. Liquid composition according to claim 1, further comprising, one or more plastifier(s) in an amount of at least 0.05% by weight of the total weight of the liquid composition.

33. Liquid composition according to claim 1, further comprising, at least one conductivity salt in an amount from 0.01% to 10% by weight of the total weight of the liquid composition.

34. Liquid composition according to claim 33, wherein said conductivity salt is selected from salts of alkaline metal, salts of alkaline-earth metals, and ammonium salts; said salts being in the form of halides, perchlorates, nitrates, thiocyanates, formiates, acetates, sulfates, propionates, trifluoroacetates, triflates, hexafluorophosphates, hexafluoroantimonates, tetrafluoroborates, picrates, carboxylates and sulfonates.

35. Liquid composition according to claim 34, wherein said salts of alkaline metal is (are) selected from lithium, sodium, and potassium.

36. Liquid composition according to claim 34, wherein said salts of alkaline-earth metals is (are) selected from magnesium and calcium.

37. Liquid composition according to claim 1, further comprising, one or more additive(s) selected from anti-foaming agents; chemical stabilisers; UV stabilisers; surfactants; agents inhibiting corrosion by salts; bactericides, fungicides and biocides; and pH regulating buffers.

38. Liquid composition according to claim 1, which when it comprises at least one polymer solubilised in the solvent of the liquid composition, is characterised in that said polymer has a weight average molecular mass of more than 70,000 Daltons.

39. Liquid composition according to claim 1, which when it comprises solid particles, is characterised in that the maximum size of the solid particles is from 2 to 10 μm.

40. Method of printing, comprising: providing the liquid composition according to claim 1 in a printer or printing head applying a binary deflected continuous jet printing technique, wherein said liquid composition forms upon printing drops which are not charged by an electric field, which each have a zero electric charge, which each form a dipole under the effect of an electric field, and which are then deflected by said electric field.

41. Method of printing, and/or treating, and/or marking and/or encoding substrates, supports or objects by projection on these substrates, supports or objects of the liquid composition according to claim 1, with a binary deflected continuous jet printing technique, wherein said liquid composition forms upon printing drops which are not charged by an electric field, which each have a zero electric charge, which each form a dipole under the effect of an electric field, and which are then deflected by said electric field.

42. Method of printing, and/or treating, and/or marking and/or encoding substrates, supports or objects according to claim 41, wherein the substrate, support or object is a porous substrate, support or object.

43. Method of printing, and/or treating, and/or marking and/or encoding substrates, supports or objects according to claim 41, wherein the substrate, support or object is a non-porous substrate, support or object.

44. Substrate, support, or object provided with a printing, and/or a treating, and/or a marking and/or an encoding obtained by drying and/or absorption of the liquid composition according to claim 1.

45. Substrate, support, or object of claim 44, wherein the substrate, support, or object is a porous substrate, support, or object.

46. Substrate, support, or object of claim 44, wherein the substrate, support, or object is a non-porous substrate, support, or object.

47. Substrate, support or object according to claim 44, characterised in that the substrate is made of metal; made of glass; made of ceramic; made of a material containing cellulose, made of an organic polymer, made of poly (methyl methacrylate) PMMA, made of a fabric, made of a textile, made of natural or synthetic rubber, made of any other non-porous or porous substance, or made of a composite of several of the aforementioned materials.

48. Substrate, support, or object according to claim 47, wherein the metal is aluminium.

49. Substrate, support, or object according to claim 47, wherein the material containing cellulose is selected from cellophane, paper, optionally coated or glossy paper, cardboard or wood.

50. Substrate, support, or object according to claim 47, wherein the organic polymer is a thermoplastic polymer.

51. Substrate, support, or object according to claim 50, wherein the thermoplastic polymer is selected from among PVDCs, PVCs, polyesters, PETs, polyolefins.

52. Substrate, support, or object according to claim 51, wherein the thermoplastic polymer is selected from polyethylenes (PE) and polypropylenes (PP).

53. Substrate, support, or object according to claim 47, wherein the metal is steel.

54. Liquid composition according to claim 1, wherein the liquid composition is an ink composition.

55. Liquid composition according to claim 2, wherein the liquid composition is an ink composition.

* * * * *